US011272227B1

(12) United States Patent
Enigma et al.

(10) Patent No.: US 11,272,227 B1
(45) Date of Patent: Mar. 8, 2022

(54) BUFFER RECOVERY IN SEGMENTED MEDIA DELIVERY APPLICATIONS

(71) Applicant: Amazon Technologies, Inc., Seattle, WA (US)

(72) Inventors: Brian Enigma, Portland, OR (US); Ryan Hegar, Happy Valley, OR (US); Matthew Scharr, Portland, OR (US); Bhushan Mehendale, Portland, OR (US); Avinash Priya Khurana, Beaverton, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/364,080

(22) Filed: Mar. 25, 2019

(51) Int. Cl.
*H04N 21/2187* (2011.01)
*H04N 21/234* (2011.01)
*H04N 21/6379* (2011.01)
*H04N 21/236* (2011.01)

(52) U.S. Cl.
CPC ... *H04N 21/23406* (2013.01); *H04N 21/2187* (2013.01); *H04N 21/236* (2013.01); *H04N 21/6379* (2013.01)

(58) Field of Classification Search
CPC .......... H04N 21/23406; H04N 21/236; H04N 21/2187; H04N 21/6379
See application file for complete search history.

(56) References Cited

U.S. PATENT DOCUMENTS

| 2008/0163289 | A1* | 7/2008 | Keys ...................... H04N 5/783 725/32 |
| 2014/0297813 | A1* | 10/2014 | Gomes .................. H04L 65/602 709/219 |
| 2015/0026358 | A1* | 1/2015 | Zhang .................. H04N 9/8205 709/231 |
| 2017/0353754 | A1* | 12/2017 | Vaclik .................. H04N 21/436 |

* cited by examiner

*Primary Examiner* — Hsiungfei Peng
(74) *Attorney, Agent, or Firm* — Nicholson De Vos Webster & Elliott, LLP

(57) ABSTRACT

Various embodiments of methods, apparatus, systems, and non-transitory computer-readable storage media for buffer recovery in segmented media delivery applications are described. Segments of a live media presentation are stored in a buffer. A number of segments in the buffer is determined to have fallen below a threshold. Based on that determination, various buffer recovery techniques may be performed. In one such technique, a buffered segment is decoded into a first set of video frames, the first set of video frames having a first playback duration. The first set of video frames is encoded into a second set of video frames having a second playback duration that is longer than the first playback duration.

20 Claims, 10 Drawing Sheets

BUFFER RECOVERY IN SEGMENTED MEDIA DELIVERY APPLICATIONS

BACKGROUND

As Internet Protocol-based networks have evolved, newer services and standards have been developed for video and other media delivery over-the-top of networks such as the Internet. Many of these newer services and standards stream media over the network by dividing the source media into segments that encode various media types such as video, audio, text, and/or other data. Each segment covers some duration of the overall media presentation (e.g., 2 seconds). Client applications play the media by requesting, via the network, delivery of segments from a server application. The client application decodes the one or more media types within the segment to cause the device executing the client application to render the media to a user (e.g., displaying video on a screen, outputting audio via a speaker, etc.). Often the server application makes several versions of the segments available of varying quality to allow the client to dynamically adapt to changing network conditions. Since quality typically relates to the data size of the segment, if the network becomes congested, the client application can begin requesting segments of a lower quality version with reduced size relative to their higher quality counterparts, allowing the client to continuously render the media to the user with limited interruption.

BRIEF DESCRIPTION OF DRAWINGS

Various embodiments in accordance with the present disclosure will be described with reference to the drawings.

DETAILED DESCRIPTION

Various embodiments of methods, apparatus, systems, and non-transitory computer-readable storage media for buffer recovery in segmented media delivery applications are described. Buffer recovery attempts to reduce the impact on user experience when segments of a media presentation fail during transit from a source to a destination over a network—whether due to an issue with the source of the media presentation, the network over which the segments of the media presentation are being delivered, etc. Typically, the destination requests segments from the source and builds up some amount of buffer before beginning playback. For example, the source may retrieve ten, two-second long segments to provide twenty seconds of buffered media. As a decoder consumes buffered segments, the destination continues to retrieve segments from the source and write them to the buffer, thereby keeping sufficient data in the buffer to avoid starving the decoder. In the case of pre-recorded media presentations, if the destination fails to receive a segment, the destination can advance its requests to retrieve the next two segments from the source to re-fill the buffer, for example.

In live media presentations, however, advancing segment requests is not an option. Future segments become available at the same rate the decoder is consuming the buffered segments, so the destination is unable to retrieve future segments to replenish the buffer any faster than the decoder is consuming the buffered segments. As a result, each time a segment fails to be delivered in a live media presentation, the segment being decoded from the buffer catches up by one to the so-called "live edge" of the media presentation being written to the buffer. After enough delivery failures, the decoder can exhaust the segments in the buffer when it catches up to the live edge of the media presentation. The result can be a halting or erratic presentation experience to viewers. Embodiments of the present disclosure avoid buffer exhaustion by monitoring for segment delivery failures and, once detected, triggering a buffer recovery action to "slow down" the rate at which segments are consumed from the buffer relative to the live edge to allow the buffer to refill. Various conditions for triggering a buffer recovery action are disclosed, as are various techniques to slow down or delay segment consumption from the buffer.

Figure 1:
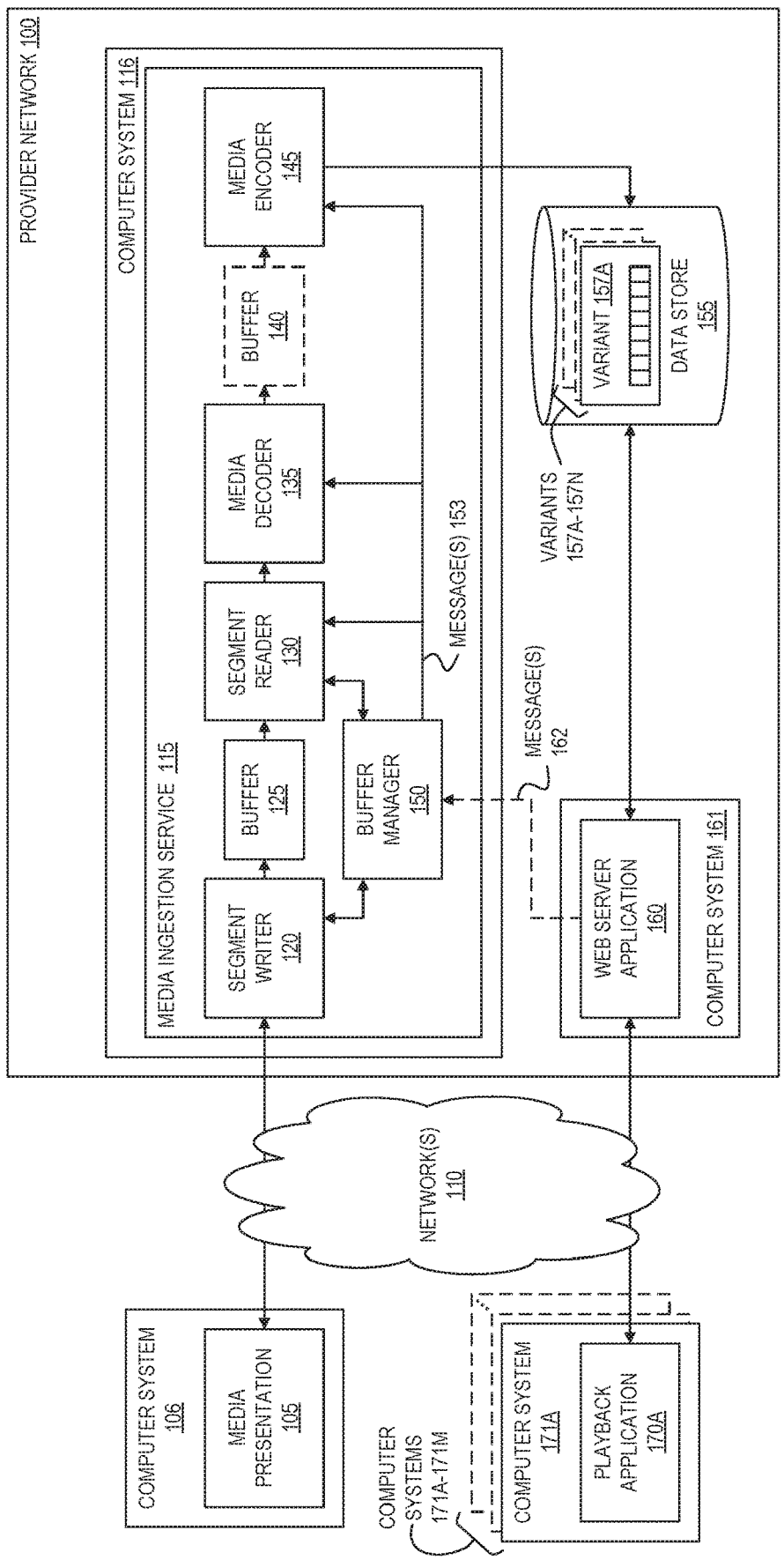
FIG. 1 is a block diagram illustrating an exemplary application of buffer recovery in segmented media delivery according to some embodiments.

FIG. 1 is a block diagram illustrating an exemplary application of buffer recovery in segmented media delivery according to some embodiments. In this exemplary application, a cloud-based service ingests a live media presentation via segmented delivery and transcodes the media presentation into a number of formats for adaptive bitrate streaming for distribution via segmented delivery to viewers. Such a service may be used for the distribution of live media such as sports, concerts, surveillance cameras, and the like. In particular, the media ingestion service 115 obtains a media presentation 105 via segmented delivery over one or more networks 110, such as the internet. A computer system 106 that is remote from the provider network 100 or located within the provider network 100 can generate, host, or otherwise make available the media presentation 105. The media ingestion service 115 generates one or more media presentation variants 157 to distribute via segmented delivery to a playback application 170 that renders the media presentation to a viewer. Exemplary segment delivery techniques include those for the Hypertext Transfer Protocol (HTTP) such as the Motion Picture Expert Group (MPEG) Dynamic Adaptive Streaming over HTTP (MPEG-DASH) or HTTP Live Streaming (HLS). Often in segmented delivery an application requesting segments first obtains a manifest, index, or other file that identifies the network location(s) of the segments in the media presentation. Such an identification may be static (e.g., via explicit per-segment Uniform Resource Identifiers (URIs)) or dynamic (e.g., via a URI template that the requesting application modifies for future segments). Other delivery techniques may be used, including User Datagram Protocol (UDP)-based approaches such as the Real-time Transport Protocol (RTP).

During normal operation, the media ingestion service 115 obtains the manifest of the media presentation 105 and begins requesting the identified segments. The requested segments are passed through to a decoder 135 to extract the encoded media data within the segments. In some embodiments, a demultiplexer may separate multiple different media streams embedded within a segment, if present, such as audio, video, text, etc. The different streams may be processed by separate decoders for the different streams (not shown). A media encoder 145 obtains the decoded media data (e.g., from a buffer 140) and encodes it into one or more variants 157A to 157N, where N is the number of different variants 157 encoded for distribution. The different variants 157 may be encoded with different permutations of encoding qualities and/or formats (e.g., for audio, video, etc.). For example, the media ingestion service 115 may obtain a 4K video stream with lossless audio compression and generate variants 157 that have various permutations of different video and audio quality and/or formats. For example, one variant might have low resolution video encoded with H.264 while another has high resolution video encoded with H.264. Similarly, one variant might use one encoding standard for a certain type of media while another variant uses a different encoding standard. Like the media presentation 105, each of the variants 157 is segmented for delivery: the media encoder 145 or another component (not shown) segments synchronous portions of each of the decoded media components of the media presentation 105 (e.g., video, audio, text, etc.) into segments of a variant 157. Note that beginning and end of the content of a given segment of a variant 157 need not correspond to the beginning and end of a segment of the media presentation 105. In some embodiments, the media encoder 145 publishes the segments of the variants 157 to a data store 155, which may be any form of storage medium (e.g., solid-state disk, magnetic disk, random-access memory, etc.). In some embodiments, the media encoder 145 may further generate a manifest for each of the variants or a single manifest that identifies each of the variants by information such as compression, format, etc. A web server application 160 responds to requests for segments from the variants 157 by retrieving the requested segment from the data store 155 and sending it to the requestor.

Users who wish to view the media presentation instruct a playback application 170 to connect to the web server application 160 of the provider network 100. In some embodiments, the web server application 160 provides a manifest to the playback application 170 that identifies the available variants 157. The playback application 170 selects a variant 157 (e.g., based on network conditions, supported encoding types, etc.) and begins requesting segments of the selected variant from the web server application 160. In the case of a live media presentation, the playback application 170 may initially request the most recently published segment of the variant. In adaptive bitrate techniques, the playback application 170 can switch between variants 157 subject to network conditions.

At the front end of the media ingestion service 115 is a segment writer 120, a buffer 125, a segment reader 130, and a buffer manager 150. The segment writer 120 requests segments of the media presentation 105 from the computer system 106 and writes those segments to the buffer 125. The segment reader 130 retrieves segments from the buffer 125 for downstream decoding. In some embodiments, the segment reader 130 is part of the media decoder 135.

During normal operation, the rate at which segments of the media presentation 105 are written into the buffer 125 tracks the rate at which segments are being read from the buffer 125 for downstream decoding and variant encoding. In some cases, however, the delivery of a segment may be interrupted (e.g., as a result of an error at the computer system 106 or within the network(s) 110) resulting in the segment writer's failure to write a segment to the buffer 125.

Furthermore, in some applications only a single version of the media presentation is available, limiting the ability of the media ingestion service 115 to adapt to different versions, e.g., using adaptive bitrate streaming techniques such as HLS or MPEG-DASH. As described above, in the case of a live presentation, once some number of segments fail to be delivered, the buffer 125 may underrun (e.g., the segment reader 130 exhausts all available segments in the buffer 125 before the next one is written by the segment writer 120). To avoid or at least mitigate buffer exhaustion, the buffer manager 150 determines when to take a corrective action to recover some number of segments in the buffer 125. When the buffer manager 150 determines buffer recovery is needed, the buffer manager 150 sends one or more messages 153 to one or more of the components of the media ingestion service 115 that are downstream of the buffer 125 to initiate a corrective action. In some embodiments, the determination of when to initiate a corrective action is based on one or more thresholds related to the number of segments in the buffer 125. In some embodiments, the determination may further account for viewership data as relayed in one or more messages 162 from the web server application 160 to the buffer manager 150 that indicate, for example, when there is a limited number of viewers (e.g., at an off hour such as 3:00 AM or during a period when the number of viewers is below some threshold). Additional details about the determination of when to recover the buffer 125 are described below with reference to FIG. 2.

The message(s) 153 adjust the behavior of component(s) downstream of the buffer 125 (e.g., the media decoder 135) to reduce the rate at which segments are consumed from the buffer 125 or to delay the consumption of segments from the buffer 125. One exemplary corrective action would be to cause a segment in the buffer 125 to be repeated. For example, if the segment reader 130 is feeding the media decoder 135, the buffer manager 150 can send a message to the segment reader 130 to repeat a segment fed to the media decoder 135. Another exemplary corrective action would be to cause a static image to be displayed for the duration of the missing segment. For example, the buffer manager 150 can send a message to the media decoder 135 to repeat the final frame of the previous segment or to multiplex in some other static screen (e.g., a slate screen, color bars, etc.). Alternatively, the buffer manager 150 can send a message to the media encoder 145 to encode a segment of the variants 157 using the same frame in the buffer 140 for the duration of the missing segment. Another exemplary corrective action would be to increase the duration of successfully received segments during encoding into variants 157 relative to the media presentation 105. The buffer manager 150 can send a message to the media encoder 145 to adjust a time base of the encoded variants (e.g., change from 30 frames-per-second (fps) to 29.98 fps) or to periodically repeat frames in successfully received segments (e.g., repeat every 60th frame). If multiple media types are present in the segment, the buffer manager 150 can cause audio and/or text components to be modified to remain synchronized with the video frames. In doing so, the buffer 125 can recover a fraction of the duration of the missing segment with each successfully received segment. Additional details regarding buffer recovery techniques are described below with reference to FIG. 3.

In some embodiments, control messages are used to coordinate the timing of segments as they are input to the media decoder 135, optionally buffered in the buffer 140, and input into the media encoder 145. For example, the downstream components may output a ready/busy signal to their upstream data source to indicate when they can begin receiving the next segment or frames from the next segment. Thus, by adjusting the rate at which media ingestion service components downstream from the buffer 125 consume data, the overall rate of consumption of segments from the buffer 125 can be reduced (e.g., the media encoder 145 slows down the media decoder 135, which in turn slows down the segment reader 130).

In the example illustrated in FIG. 1, the applications and services are programs (e.g., sets of instructions for execution by a processor) executed by computer systems 106, 116, 161, and 171A to 171M. Other embodiments may incorporate portions of the components of the applications or services as hardware or other logic (e.g., an accelerator to encode or decode data). For example, the media presentation 105 is made available by a computer system 106, which may be a contribution encoder, that receives a high-quality video input and encodes it for segmented delivery to the cloud-based ingestion and distribution service. The cloud-based ingestion of the media presentation is performed by the media ingestion service 115 executed by a computer system 116. In some embodiments, the media ingestion service 115 is a distributed service executed by multiple computer systems. The distribution of the media presentation is handled by a web service application 160 executing by a computer system 161. Playback applications 170A to 171M execute on viewers' computer systems 171A to 171M, such as personal computers, tablets, smartphones, or the like, where M is the number of computer systems receiving a variant 157. The buffers 125, 140 and the data store 155 can be implemented using memory devices or other storage devices, which may be locally (e.g., via a bus) or remotely (e.g., via a network) attached to the computer systems for reading and/or writing data.

Figure 2:
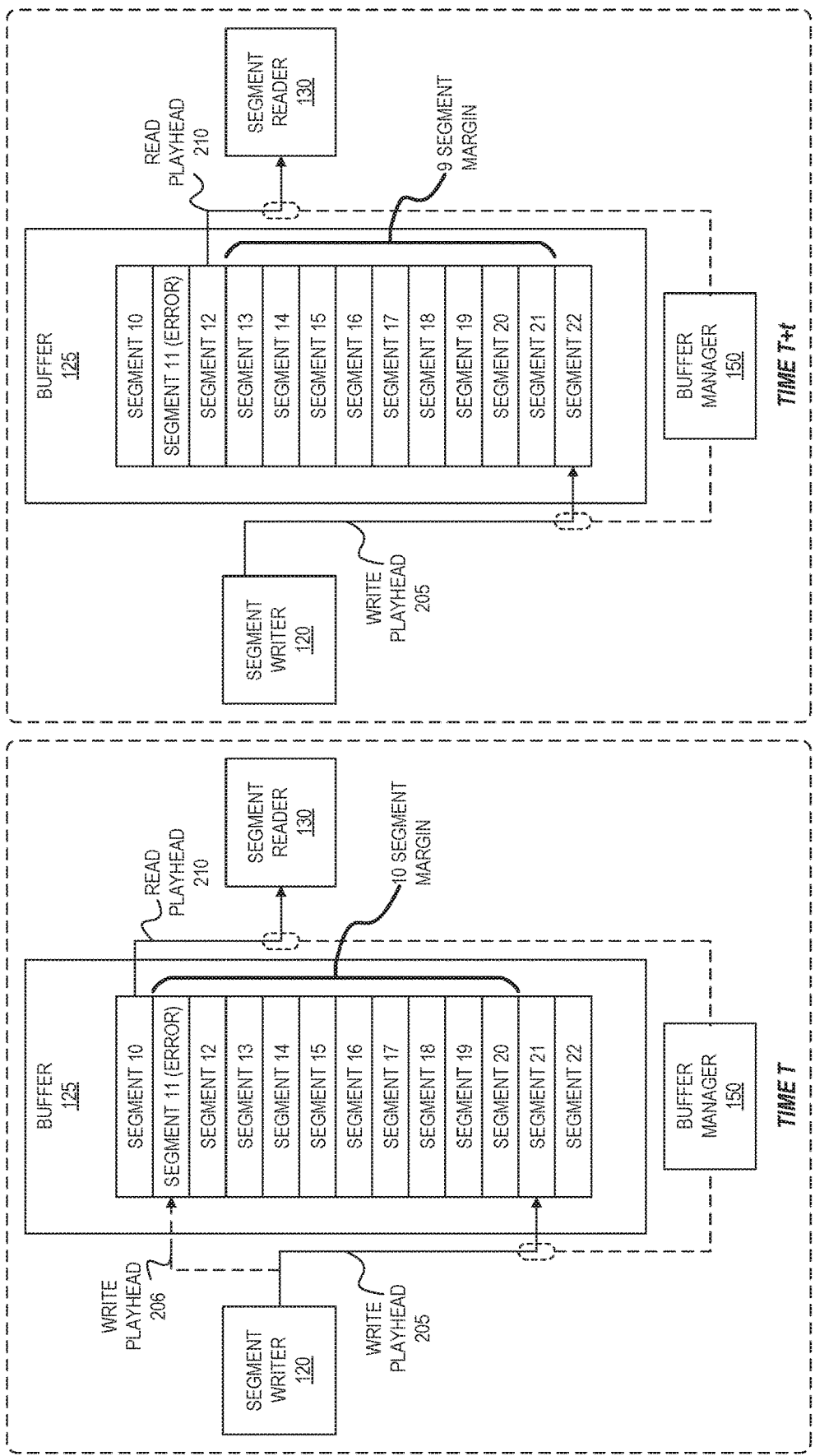
FIG. 2 is a block diagram illustrating an exemplary buffer monitoring technique according to some embodiments.

FIG. 2 is a block diagram illustrating an exemplary buffer monitoring technique according to some embodiments. The left side of FIG. 2 illustrates the state of the buffer 125 at a time T, and the right side of FIG. 2 illustrates the state of the buffer 125 at some later time T+t. In this example, there is an error fetching segment 11 of the media presentation. The segment writer 120 and segment reader 130 write to and read from buffer locations respectively referred to as a write playhead 205 and a read playhead 210. As described above, the segment writer 120 fetches segments of the source media presentation (e.g., media presentation 105) and writes them to the buffer 125, while the segment reader 130 reads segments from the buffer 125 to feed to a downstream decoder (e.g., the media decoder 135). The buffer manager 150 monitors the relative locations of the read and write playheads 205, 210 to determine when to take a corrective action to recover some number of segments in the buffer 125.

In some embodiments, the playheads 205, 210 correspond to pointers to locations in the buffer that store segments, and the pointers are maintained in a queue. The buffer manager 150 can monitor the number of entries in the queue between the locations of the read and write playheads 205, 210 to determine the buffer margin. As shown on the left side of FIG. 2, the current state of the buffer 125 includes a ten-segment margin between the read and write pointers. As noted above, in some embodiments, the segment writer 120 may fetch some predetermined number of segments before the segment reader begins passing segments downstream (e.g., a buffer of ten, two-second long segments).

Turning to the right side of FIG. 2 at time T+t, the segment writer 120 has progressed to fetching segment 23 of the media presentation and the segment reader 130 has encountered and skipped segment 11 due to the error in delivery. The error results in a reduction in the margin from ten segments to nine segments. Note that although segment margin is used to describe buffer status here, other measurements may be used (e.g., amount of data relative to a full buffer, etc.). If enough errors occur, the margin can be reduced to zero. In such a situation, the buffer has become exhausted, potentially causing a negative impact on the resulting playback of the media presentation if the read playhead 210 attempts to read from a partially fetched segment, for example.

To prevent buffer exhaustion, the buffer manager 150 monitors the status of the buffer 125 and initiates corrective action to recover the margin in the buffer. The determination to initiate a corrective action may be based on one or more thresholds relative to the amount of data in the buffer or the number of buffered segments. For example, the buffer manager 150 can initiate a corrective action each time a segment fails in delivery to maintain a full buffer (e.g., as soon as the read playhead completes segment 10 or encounters segment 11), or only when the buffer is exhausted (e.g., when the read playhead catches up to the write playhead).

As another example, the buffer manager 150 can initiate a corrective action when the segment margin falls below some threshold to ignore some initial number of segment delivery failures. Such a scenario might be desirable where the rate of failed segment deliveries is low relative to the duration of the media presentation such that the buffer is unlikely to underrun prior to the end of the media presentation.

As yet another example, the buffer manager 150 can initiate various corrective actions at different thresholds. For example, the buffer manager 150 can initiate a first type of corrective action with an unobtrusive interruption in playback (e.g., recovering fractions of the buffer for subsequent segments) when the segment margin falls below a first threshold and initiate a second type of corrective action with a more obtrusive interruption in playback (e.g., display a static frame for some duration) when the segment margin falls below a second, lower threshold. With reference to FIG. 1, when the amount of data in the buffer falls below the first threshold, the buffer manager 150 can send a first message to the media encoder 145 to cause a first corrective action (e.g., increase the duration of encoded segments relative to the media presentation). Then, if the rate of failed segments exceeds the rate at which the media encoder 145 is able to recover margin and the amount of data in the buffer falls below the second threshold, the buffer manager 150 can send a second message to the segment reader 130 or media decoder 135 to cause another corrective action (e.g., repeat segments or frames). The buffer manager 150 can continue both corrective actions or halt the first corrective action when it initiates the second corrective action.

Other techniques for monitoring the status of the buffer besides the segment margin between the playheads 205, 210 may be used. For example, the segment writer 120 can message the buffer monitor 150 when a segment fails to be received, and the buffer monitor 150 can track how many segments have been recovered using the buffer recovery techniques described herein.

In some embodiments, the buffer manager 150 disables the corrective actions once the segment margin has recovered above a threshold (e.g., to the maximum margin, some fraction of the maximum margin) or until some number of segments have been recovered.

In some embodiments, the determination to initiate a corrective action can be influenced from usage data (e.g., messages 162 from the web server application 160). For example, the corrective action threshold(s) can be adjusted based on current viewership (e.g., from 5 segments to 7 segments). As another example, the current viewership may override the corrective action threshold(s) (e.g., when viewership drops below some number or to zero, recover to a full buffer).

In some embodiments, the segment writer 120 continues to retry fetching segments from source media presentation until the read playhead 210 reaches the segment that fails to be delivered. For example, the segment writer 120 may be a multi-threaded process that initiates a thread each time it requests a new segment. The segment writer 120 can allow the thread associated with a segment to execute until the read playhead 210 has passed that segment. In other embodiments, the segment writer 120 halts attempt to fetch a segment after some number of failed requests or some elapsed time duration.

Once the buffer manager 150 has determined that it should initiate a corrective action, the buffer manager 150 sends messages to component(s) downstream of the buffer to allow for buffer recovery.

FIGS. 3A to 3D are diagrams illustrating various buffer recovery techniques according to some embodiments. Different buffer recovery techniques provide different degrees of disruption in media playback to the viewer and different rates at which the buffer is recovered. For example, displaying a blank screen for the entire duration of a segment may be highly obtrusive to a viewer yet allow immediate recovery of an entire segment of buffer margin. As another example, occasionally repeating a frame while otherwise rendering continuous presentation may go undetected by a viewer but only recover a single frame at a time (e.g., if a missing segment has 60 frames, it would take 60 repeated frames before the duration of the missing segment is recovered). Note than when multiple media types are present in a media presentation, the corrective action includes preserving synchronization between the various media types (e.g., repeating or silencing audio when frames are adjusted, etc.). FIGS. 3A to 3D illustrate buffer recovery techniques in which the eleventh segment fails in delivery as described above with reference to FIG. 2. For simplicity, segments of the media presentation 105 are illustrated as having 60 frames each, although they have more or fewer frames depending on the encoding and segmentation of the media presentation 105. In particular, segment 10 has a payload of frames 541-600, missing segment 11 had a payload of frames 601-660, and segment 12 has a payload of frames 661-720.

Figure 3A:
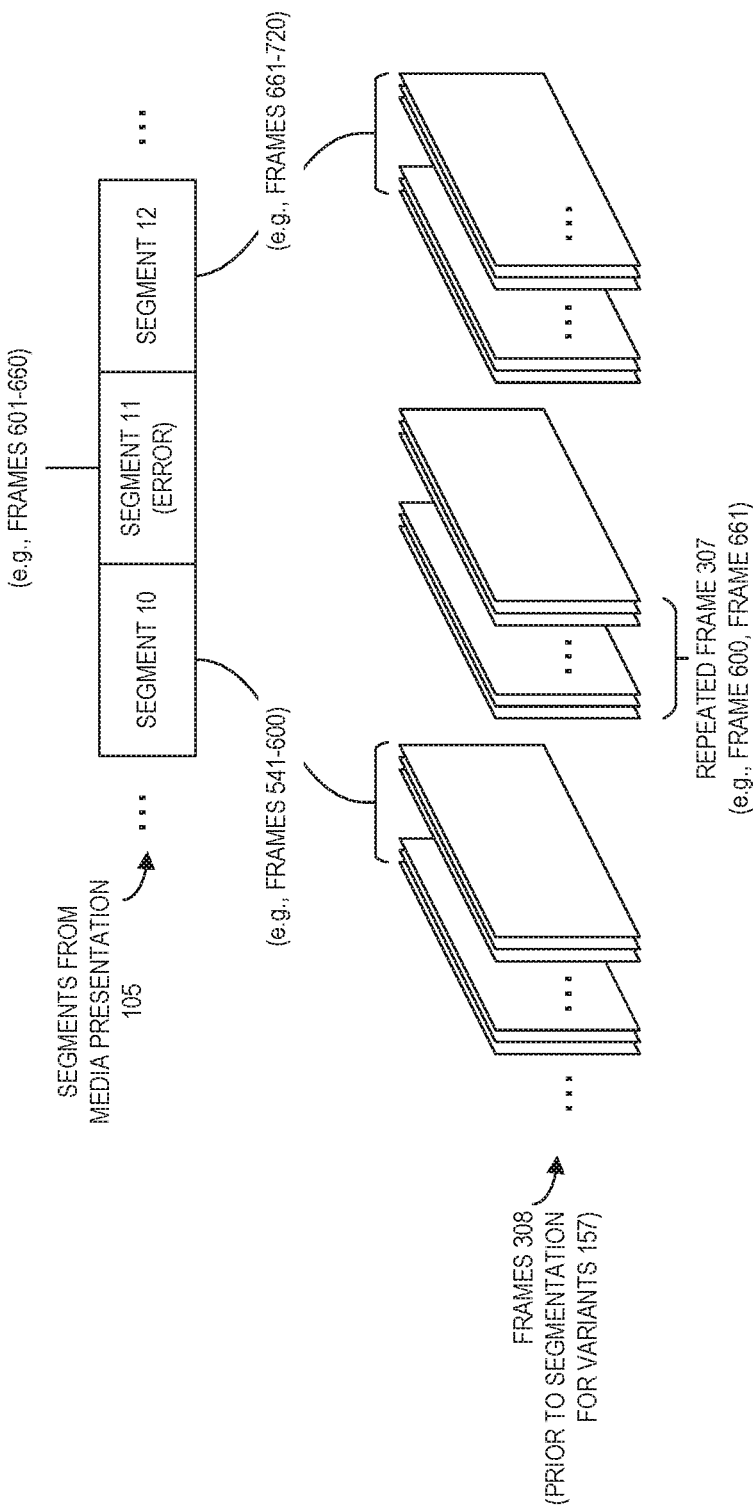
FIGS. 3A to 3D are diagrams illustrating various buffer recovery techniques according to some embodiments.

FIG. 3A illustrates one corrective action technique that entails repeating a frame 307 for the duration of the missing segment. The frame 307 is repeated for the number of frames in the missing segment, which may be determined based on time stamps in the segments bookending the missing segment or based on information in the manifest file. The frame 307 may be a blank screen (e.g., constant color), some error screen (e.g., color bars), the last frame of the prior segment (e.g., frame 600 from segment 10), or the first frame in the next segment (e.g., frame 661 in segment 12). In some embodiments, an indication of the error may be overlaid on the frame (e.g., an error message, a buffering indication, etc.). If the media presentation includes audio or text, the segment(s) including the repeated frame 307 may include silent audio and no text during that frame time. With reference to FIG. 1, the buffer manager 150 can initiate the corrective action of FIG. 3A by sending message(s) 153 to component(s) of the media ingestion service 115 downstream of the buffer 125. For example, a message sent to the media decoder 135 can cause the media decoder 135 to multiplex the frame 307 into the stream of frames being encoded by the downstream media encoder 145. As another example, a message sent to the media encoder 145 may cause the media encoder 145 to multiplex the frame 307 into the output stream of frames.

Figure 3B:
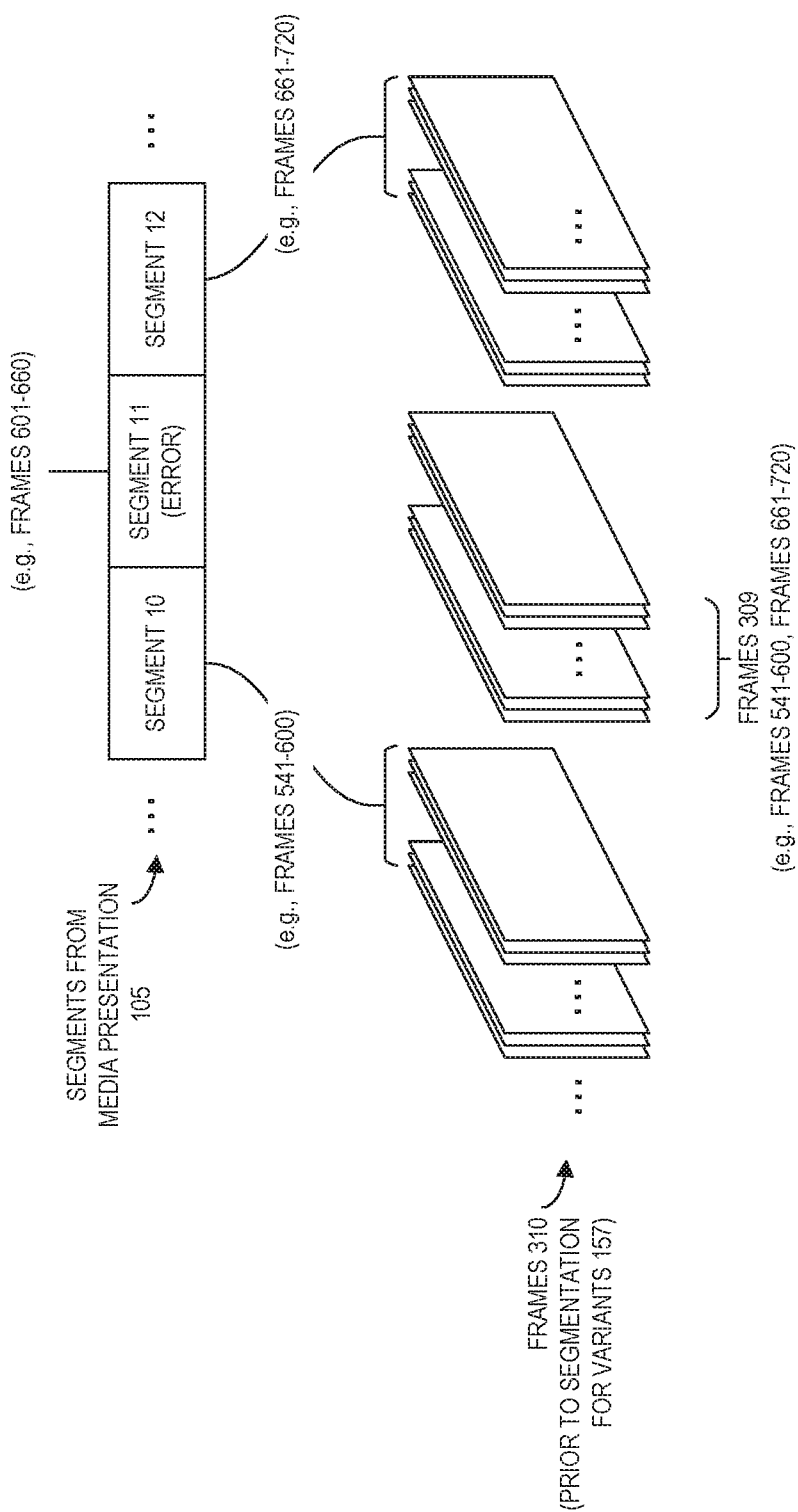

FIG. 3B illustrates another corrective action technique that entails repeating a set of frames 309 from either before or after the frames of the missing segment, assuming frames after the missing segment have been received. In this simplified example where each of the segments of the media presentation 105 have the same number of frames, the frames 309 may be frames 541-600 (from segment 10) or frames 661-720 (from segment 12). Repeating frames preserves the timing of the original media presentation and, in contrast to repeating the same frame, continues to display motion during playback. With reference to FIG. 1, the buffer manager 150 can initiate the corrective action of FIG. 3B by sending message(s) 153 to component(s) of the media ingestion service 115 downstream of the buffer 125. For example, the buffer manager 150 can cause the segment reader 130 to reset its read playhead to the beginning of a segment once it finishes with a segment. As another example, the buffer manager 150 can send a message to the media decoder 135 and/or media encoder 145 to cause it to repeat some number of frames to take the place of the frames of the missing segment.

Figure 3C:
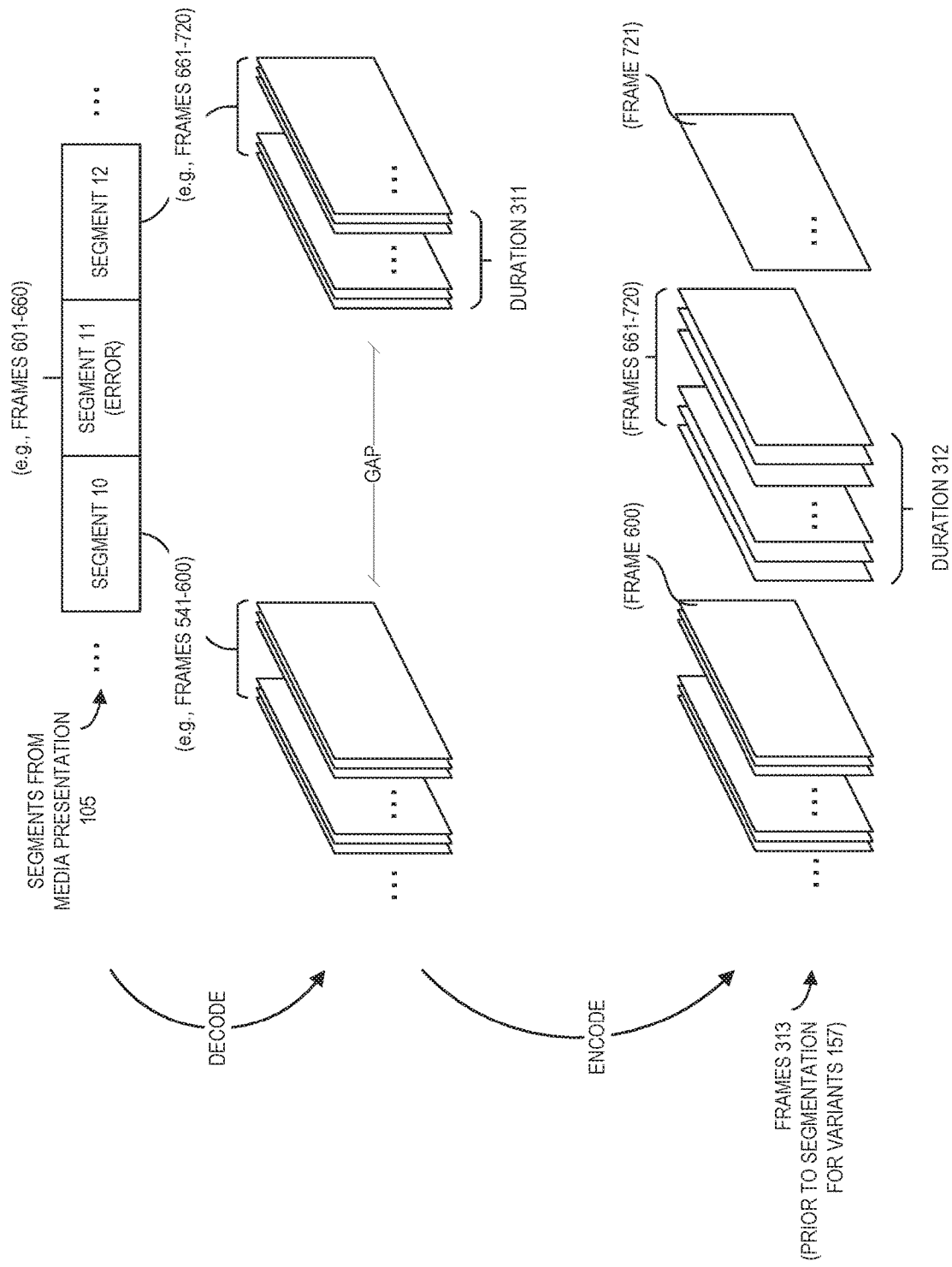

FIG. 3C illustrates another corrective action technique that entails rate of playback of frames relative to their timing in the source media presentation. Using this technique, the media ingestion service 115 distributes the time required to recover the buffer due to a missing segment across future segments. In particular, the playback duration of frames 313 subsequent to the missing segment is increased in the variants 157 relative to the duration in the source media presentation 105. As illustrated, frames 661-720 have a post-decoding playback duration 311. Post-encoding, frames 661-720 have a playback duration 312 that is longer than playback duration 311. The adjustment of playback duration can be achieved, for example, by encoding the frames with an adjusted time scale relative to the source media presentation, effectively changing the frames-per-second of the variants to down their rate of consumption during distribution relative to the source media presentation. The adjustment in playback duration can continue (e.g., with frames 721-780 in segment 13, frames 781-840 in segment 14, and so on) until some amount of the buffer is recovered. Other ways of reducing the frame rate or increasing the playback duration are possible. The slowdown may be small relative to the source rate to limit the perceptibility of the shift to the user (e.g., a tenth of a frame per second, a hundredth of a frame per second). With reference to FIG. 2, this allows the reader playhead to "advance" relative to the write playhead since two-second segments written to the buffer are read at a slower rate (e.g., one every 2.02 seconds if the frame rate is slowed by 1%) while maintaining the rate at which segments of variants are made available to viewers. With reference to FIG. 1, the buffer manager 150 can initiate the corrective action of FIG. 3B by sending message(s) 153 to component(s) of the media ingestion service 115 downstream of the buffer 125. For example, the buffer manager 150 can cause the media encoder 145 to adjust its output time scale relative to the input time scale or to duplicate frames.

Figure 3D:
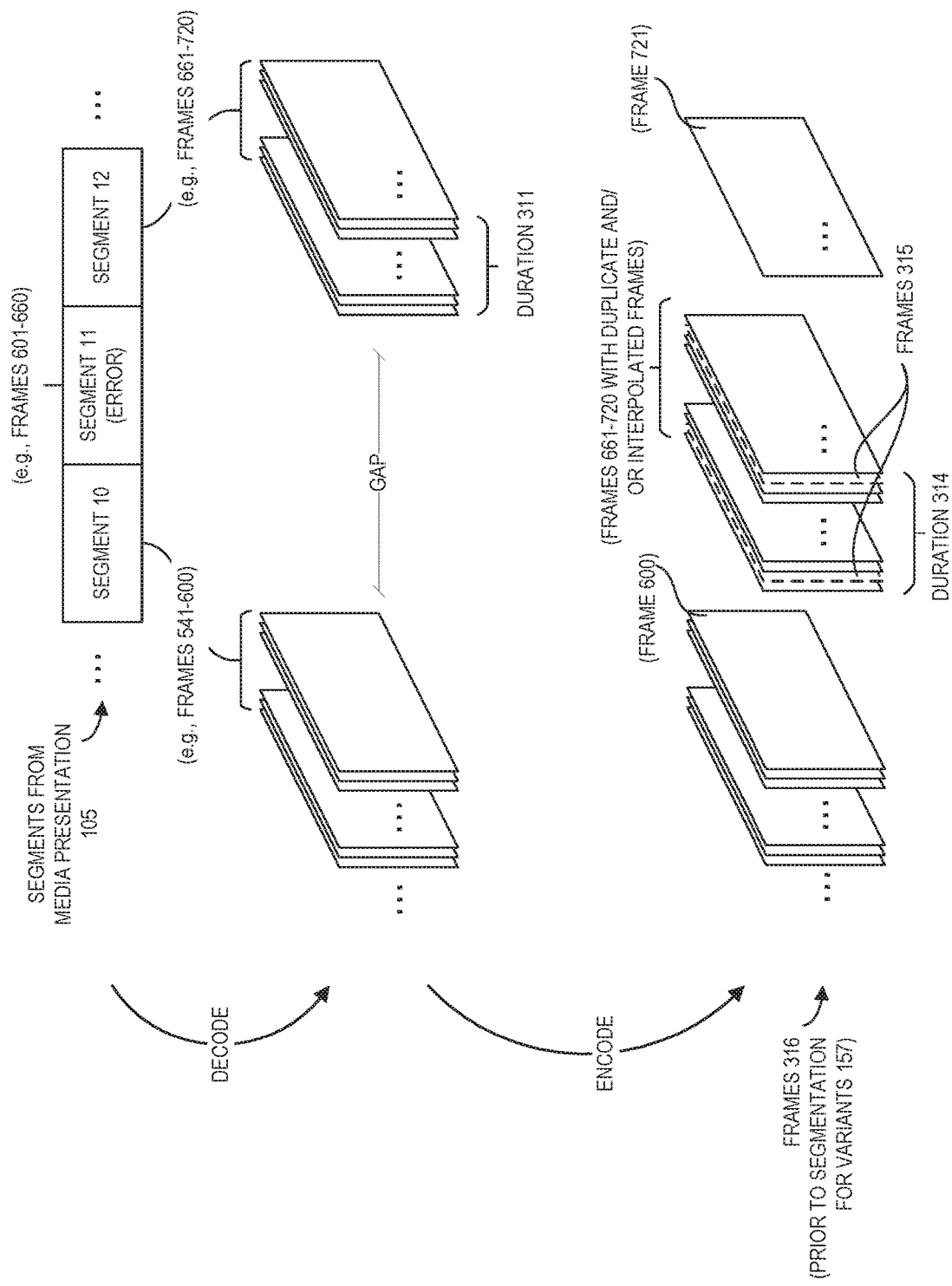

FIG. 3D illustrates another corrective action technique that entails periodically inserting duplicate or interpolated frames. Similar to the technique illustrated in FIG. 3C, periodically inserting duplicate or interpolated frames allows the media ingestion service 115 to distribute the time required to recover the buffer due to a missing segment across future segments. By inserting frames, the effective playback duration of a set of source frames is increased without adjusting their playback rate. As illustrated, frames 661-720 have a post-decoding playback duration 311. Post-encoding, frames 661-720 have a playback duration 314 that is longer than playback duration 311 by virtue of the insertion of frames 315. Frames 315 may be duplicate frames (e.g., repeating a frame twice) or interpolated (e.g., an average of two consecutive frames inserted between those frames). The insertion of frames can continue until some amount of the buffer is recovered. The frequency of inserted frames may be low to limit the perceived playback glitches to the user. With reference to FIG. 2, this allows the reader playhead to "advance" relative to the write playhead since two-second segments written to the buffer are read at a slower rate (e.g., one every 2.033 seconds if one frame is inserted for every 60 frames at a frame rate of 30 frames-per-second) while maintaining the rate at which segments of variants are made available to viewers. With reference to FIG. 1, the buffer manager 150 can initiate the corrective action of FIG. 3B by sending message(s) 153 to component(s) of the media ingestion service 115 downstream of the buffer 125. For example, the buffer manager 150 can cause the media encoder 145 to duplicate input frames or generate interpolated frames between consecutive input frames.

Note that although the buffer recovery techniques illustrated in FIGS. 3C and 3D are aligned with transitions between segments of the original media presentation 105, they need not be. For example, the insertion of duplicate or interpolated frames or the reduction in frame playback rate can occur after any frame in the presentation regardless of that frame's position within a source segment. Specifically, while the transitions to buffer recovery in FIGS. 3C and 3D are illustrated beginning with frame 331 at the start of segment 11, other transition points are possible (e.g., after frame 662, 665, 680, etc.).

Figure 4:
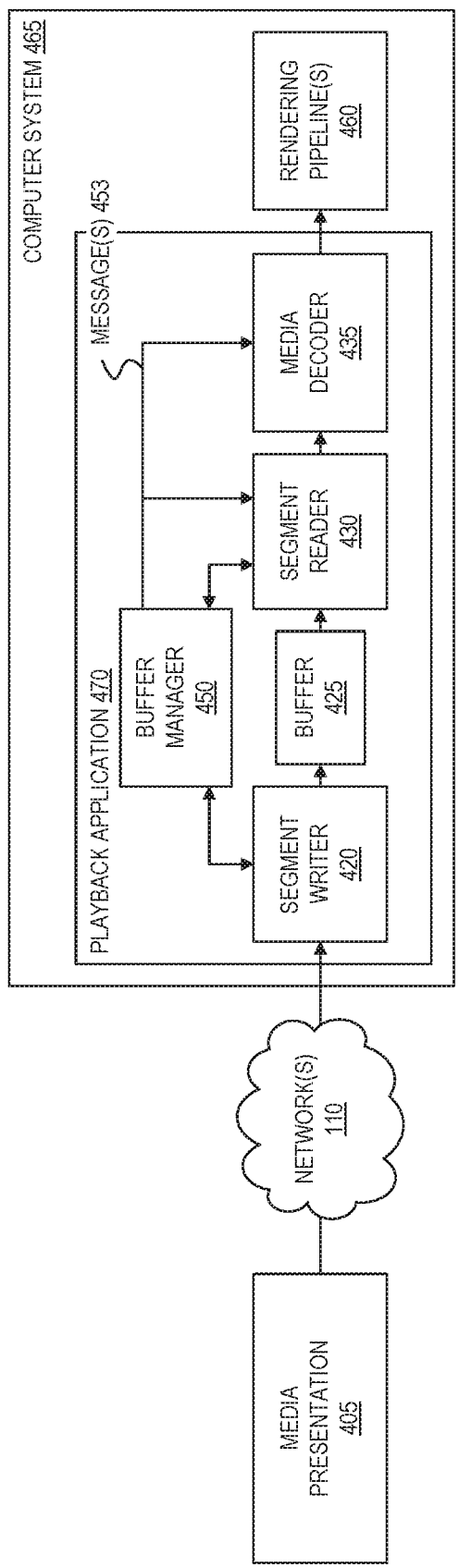
FIG. 4 is a block diagram illustrating another exemplary application of buffer recovery in segmented media delivery according to some embodiments.

FIG. 4 is a block diagram illustrating another exemplary application of buffer recovery in segmented media delivery according to some embodiments. In particular, the various techniques to determine when to take corrective action to recover the buffer and buffer recovery techniques described above may also be implemented in a playback application 470 executed by a computer system 465 (e.g., playback application 170 in computer system 171 of FIG. 1). In this application, however, the media presentation 405 is obtained via segmented delivery by the playback application 470 for rendering by the computer system 465 rather than for encoding into variants. The segment writer 420 and the segment reader 430 respectively writes segments to and read segments from the buffer 425, as described above. As before, the buffer manager 450 monitors the status of the buffer 425 to determine when to initiate a corrective action. Here, the output of the media decoder 435 is passed to rendering pipeline(s) for rendering to the viewer, such as an audio or video driver and associated output device (e.g., monitor, speakers). When the buffer manager 450 initiates corrective action, it sends one or more messages 453 to component(s) of the playback application 470 downstream of the buffer 425 to initiate a buffer recovery technique such as described above with reference to FIGS. 3A to 3D. Note that although no encoder is shown, the media decoder 435 or another component (not shown) may alter the playback rate of segments to perform corrective action similar to those described above with reference to FIGS. 3C and 3D.

Figure 5:
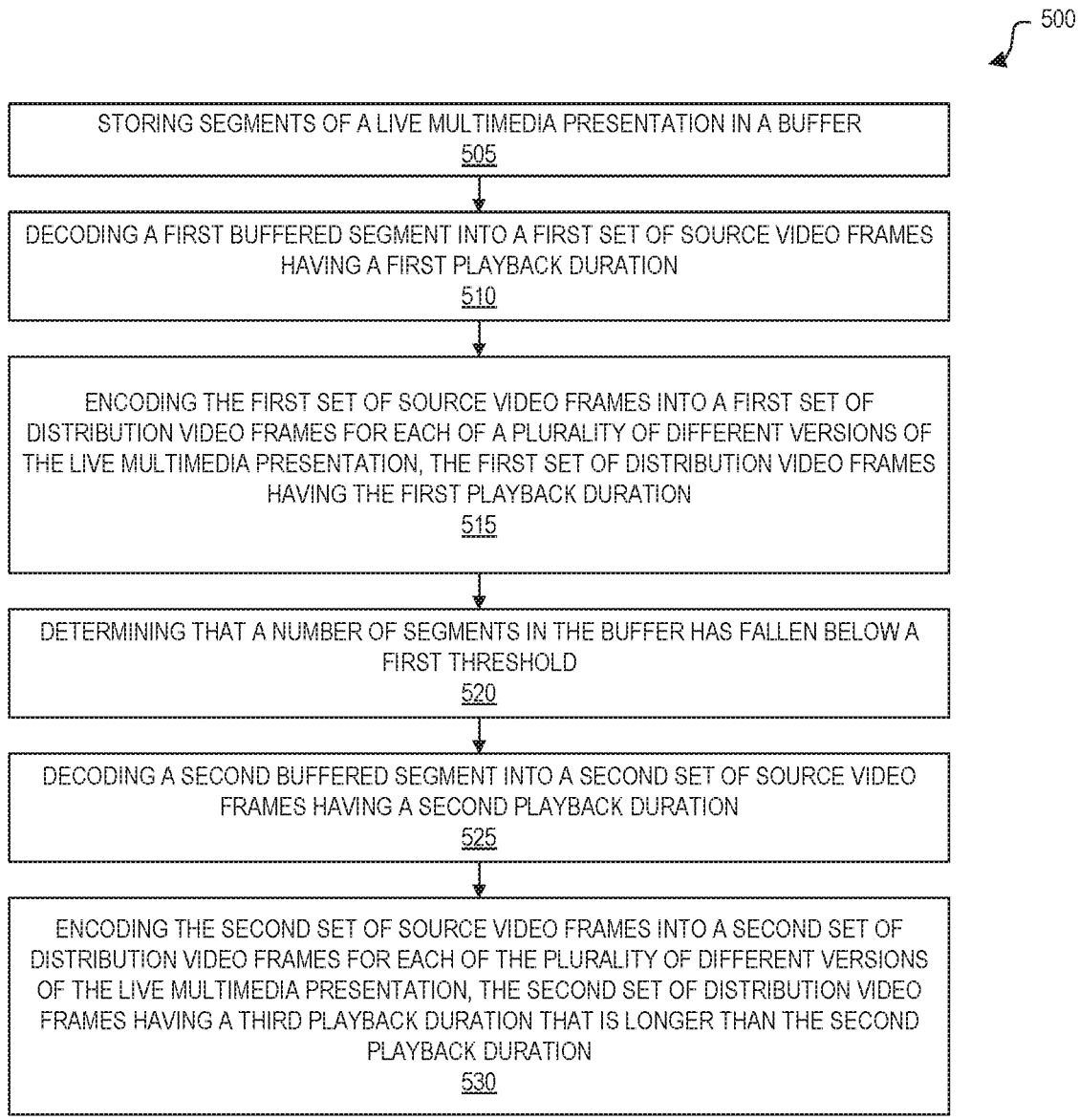
FIG. 5 is a flow diagram illustrating operations of a method for buffer recovery in segmented media delivery according to some embodiments.

FIG. 5 is a flow diagram illustrating operations of a method for buffer recovery in segmented media delivery according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by media ingestion service 115 of the other figures.

The operations 500 include, at block 505, storing segments of a live multimedia presentation in a buffer. For example, a process that fetches segments of a live multimedia presentation can request segments, via a URI, from a network location and buffer the segments received in response to the request in a buffer. A manifest can identify the network location of the segments. With reference to FIG. 1, the media ingestion service 115 of the provider network 100 fetches segments of the media presentation 105 from the computer system 106 which is connected to the provider network 100 via one or more other networks 110.

The operations 500 include, at block 510, decoding a first buffered segment into a first set of source video frames having a first playback duration. As described herein, segments of a media presentation may include one or more streams having different encoded media types (e.g., video, audio, text, etc.). Segments may represent some portion of the overall presentation (e.g., two seconds). To extract the media from the segment, a process decodes the segments (e.g., converts H.264 compressed video into uncompressed video; extracts an audio signal from a lossless compression format, etc.). With reference to FIG. 1, the media ingestion service 115 includes a segment reader 130 which passes buffered segments to the media decoder 135.

The operations 500 include, at block 515, encoding the first set of source video frames into a first set of distribution video frames for each of a plurality of different versions of the live multimedia presentation, the first set of distribution video frames having the first playback duration. As described above, a cloud-based media ingestion service may generate a number of different versions of the multimedia presentation for distribution. For example, the service may create low-, medium-, and high-quality versions of the presentation to allow playback devices to adaptively switch between versions subject to network conditions. Such version may have the same encoding format or different encoding formats. Here, the segments of the different versions of the multimedia presentation are encoded to match the duration of the source segments.

The operations 500 include, at block 520, determining that a number of segments in the buffer has fallen below a first threshold. With reference to FIG. 1, a buffer manager 150 can monitor the status of the buffer 125 using techniques described herein. For example, if the buffer 125 stores ten segments of data and has been below a seven segment, threshold, the buffer manager 150 can send message(s) to initiate corrective action to recover the buffer. As described above, the determination may be further based on usage data associated with the different versions being encoded by the encoder.

The operations 500 include, at block 525, decoding a second buffered segment into a second set of source video frames having a second playback duration, such as described above for block 510.

The operations 500 include, at block 530, encoding the second set of source video frames into a second set of distribution video frames for each of the plurality of different versions of the live multimedia presentation, the second set of distribution video frames having a third playback duration that is longer than the second playback duration. As described with reference to FIGS. 3C and 3D, exemplary corrective action techniques increase the downstream playback duration of frames relative to their playback duration in the source multimedia presentation. For example, the frames of the source multimedia presentation may be played back at a lower rate or have duplicate or interpolated frames inserted amongst them. In this manner, the live edge of the multimedia presentation can move away from the playout edge of the versions, allowing the buffer to refill.

Figure 6:
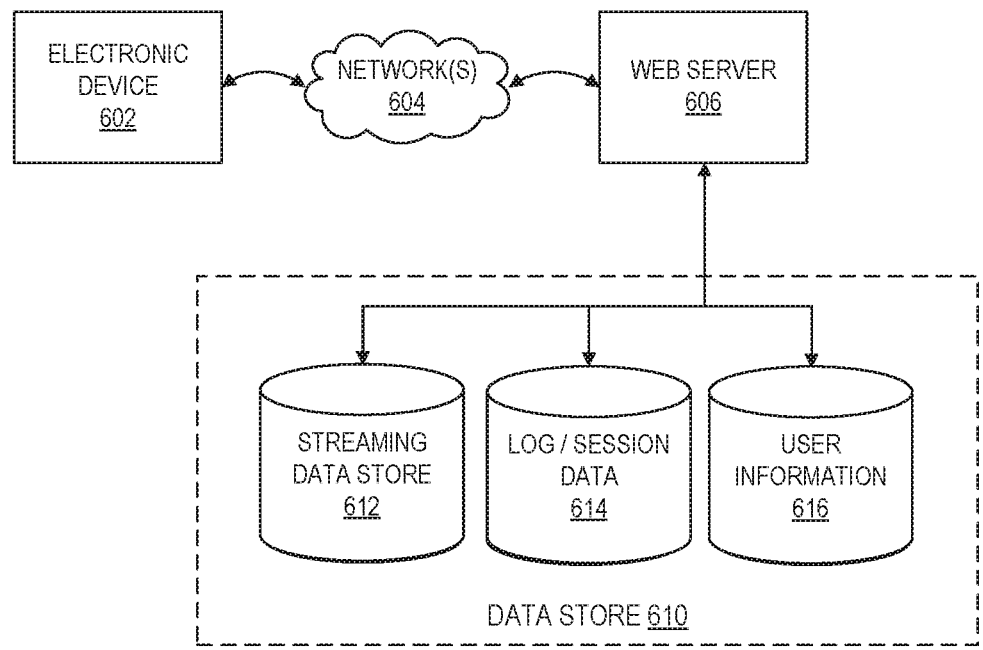
FIG. 6 illustrates an example of a client-server environment for implementing aspects of segmented delivery in accordance with various embodiments.

FIG. 6 illustrates an example of a client-server environment for implementing aspects of segmented delivery in accordance with various embodiments. For example, in some embodiments requests for segments sent by an electronic device 602 (e.g., a computer system 171) are Hyper-Text Transfer Protocol (HTTP) requests via network(s) 604 to a web server 606 (e.g., a computer system 161). As will be appreciated, although a web-based environment is used for purposes of explanation, different environments may be used, as appropriate, to implement various embodiments. The electronic device 602, which may also be referred to as a client device, can be any appropriate device operable to send and receive requests, messages or information over the network(s) 604 and convey information back to a user of the device 602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The network(s) 604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 604 includes the Internet, as the environment includes a web server 606 for receiving requests and serving content in response thereto, although for other networks an alternative device serving a similar purpose could be used, as would be apparent to one of ordinary skill in the art.

The illustrative environment includes a data store 610. It should be understood that there can be several application servers, layers, or other elements, processes or components, which may be chained or otherwise configured between the web server 606 and the data store 610, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The handling of all requests and responses, as well as the delivery of content between the client device 602 and the data store 610, can be handled by the web server 606. It should be understood that the web server 606 are not required and are merely example components, as structured code discussed herein can be executed on any appropriate device or host machine as discussed elsewhere herein. For example, the functions of the web server and transcoder may be implemented as software applications running on the same computer system, in some embodiments.

The data store 610 can include several separate data tables, databases, or other data storage mechanisms and media for storing data relating to media segments and, optionally, playlists. For example, the exemplary data store 610 includes mechanisms for storing streaming data store 612, such as segments and playlists, user information 616, and log or session data 614 related to media playback. The data store 610 is operable, through logic associated therewith, to receive instructions from the web server 606 and obtain, update, or otherwise process data in response thereto. In one example, an electronic device 602 might submit a request for a certain media segment to the web server 606, which in turn requests the identified segment from the data store 610. The web server 606 may first access the user information 616 to verify the identity of the viewer and that the viewer can access the requested data.

The web server 606 and/or data store 610 may be implemented by one or more electronic devices, which can also be referred to as electronic server devices or server end stations, and may or may not be located in different geographic locations. Each of the one or more electronic devices may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the environment 600 in FIG. 6 should be taken as being illustrative in nature and not limiting to the scope of the disclosure.

Figure 7:
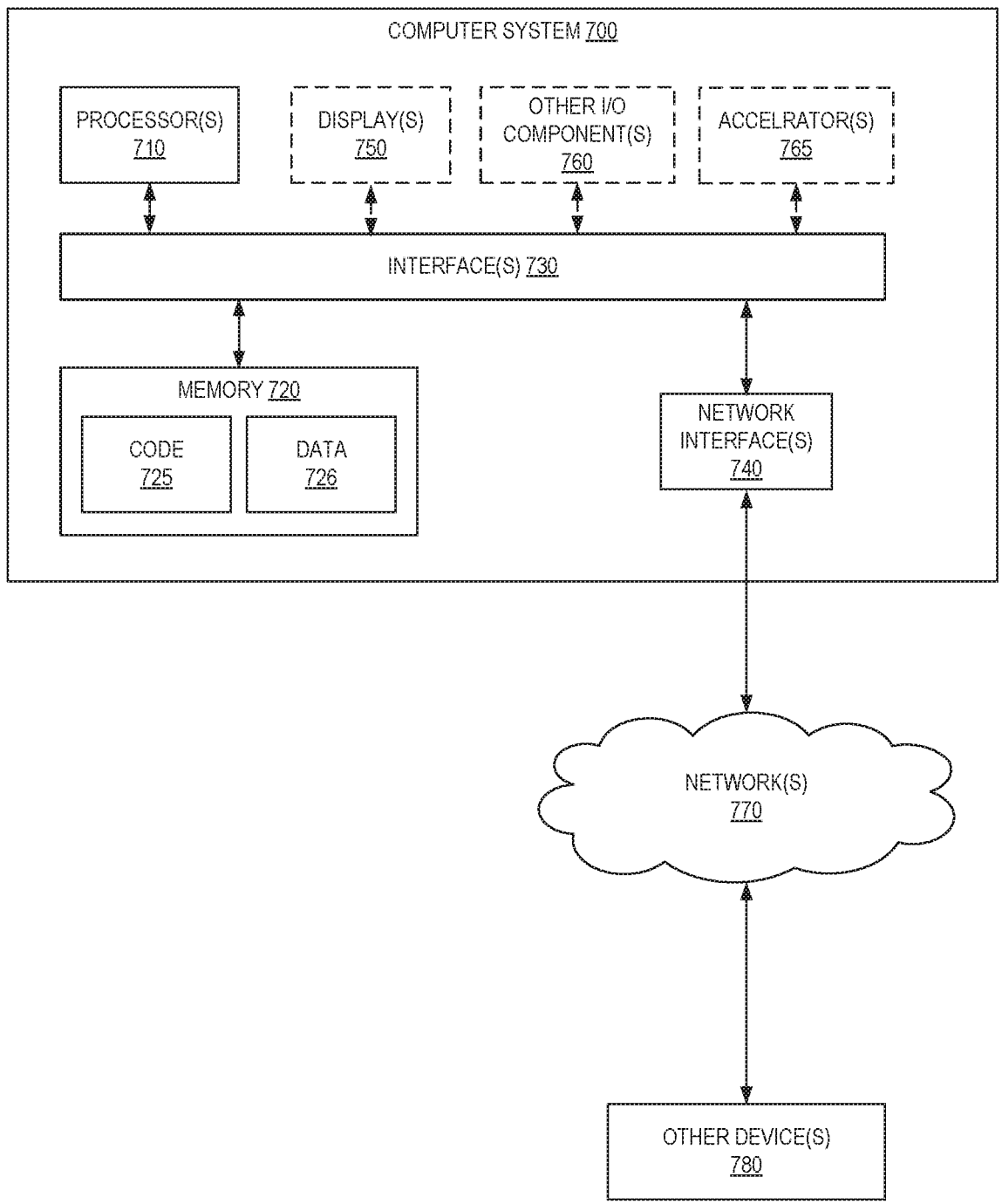
FIG. 7 is a block diagram illustrating an example computer system that may be used in some embodiments.

FIG. 7 is a block diagram illustrating an example computer system 700 that may be used in some embodiments, such as computer systems 106, 116, 161, and/or 171. Exemplary computer system 700 includes one or more processors 710 coupled to a memory 720 via an interface 730. Computer system 700 further includes a network interface 740 coupled to the interface 730. Computer system 700 optionally includes one or more displays 750, one or more other input/output (I/O) components 760, and/or one or more accelerators 765. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710

(e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

The memory 720 may store instructions and data accessible by processor(s) 710. In various embodiments, the memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within the memory 720 as code 725 and data 726.

In one embodiment, the interface 730 may be configured to coordinate I/O traffic between processor 710, memory 720, and any peripheral devices in the device, including network interface 740 or other peripheral interfaces. In some embodiments, the interface 730 may perform any necessary protocol, timing or other data transformations to convert data signals from one component (e.g., memory 720) into a format suitable for use by another component (e.g., processor 710). In some embodiments, the interface 730 may include support for devices attached through various types of peripheral buses, such as a variant of the Peripheral Component Interconnect (PCI) bus standard or the Universal Serial Bus (USB) standard, for example. In some embodiments, the function of the interface 730 may be split into two or more separate components, such as a north bridge and a south bridge, for example. Also, in some embodiments some or all of the functionality of the interface 730, such as an interface to memory 720, may be incorporated directly into processor 710.

Network interface 740 may be configured to allow data to be exchanged between computer system 700 and other devices 780 attached to a network or networks 770, such as other computer systems or electronic devices as illustrated in the other figures, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via the interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

The display(s) 750, such as a touch screen or liquid crystal display (LCD), convey visual information to a user, although some computer systems may not have a display at all (e.g., servers). The I/O components 760 provide facilities to the user for interacting with the computer system 700. Such I/O components 760 include, but are not limited to, speakers for rendering audio, keyboards, mice, or other input devices for receiving user inputs, microphones, cameras, other sensors, etc. for collecting data, etc. The accelerators 765 may provide hardware acceleration for media encode or decode operations.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 157A-157N, 171A-171M, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   storing segments of a live media presentation in a buffer;
   in response to a determination that a number of segments in the buffer has fallen below a first threshold:
     decoding a first buffered segment into a first set of video frames having a first playback duration; and
     encoding the first set of video frames to generate a second set of video frames, the second set of video frames having a second playback duration that is longer than the first playback duration; and
   in response to a determination that the number of segments in the buffer has fallen below a second threshold that is smaller than the first threshold:
     decoding a second buffered segment into a third set of video frames; and
     encoding the third set of video frames to generate a fourth set of video frames that includes a frame repeated for a duration of a missing segment of the live media presentation.

2. The computer-implemented method of claim 1 further comprising, in response to a determination that the number of segments in the buffer has increased above a third threshold:
  decoding a third buffered segment into a fifth set of video frames having a third playback duration; and
  encoding the fifth set of video frames to generate a sixth set of video frames having the third playback duration.

3. The computer-implemented method of claim 1, wherein the number of segments in the buffer is based on a number of entries in a segment queue between a first location that contains a reference to a segment being written to the buffer and a second location that contains a reference to a segment being read from the buffer.

4. The computer-implemented method of claim 1, wherein the segments of the live media presentation are identified in a manifest that includes a network location of the segments.

5. The computer-implemented method of claim 4, wherein the manifest identifies only a single version of the live media presentation.

6. The computer-implemented method of claim 1, wherein the second set of video frames has a slower framerate than the first set of video frames.

7. The computer-implemented method of claim 1, wherein the second set of video frames includes a number of frames greater than a number of frames in the first set of video frames.

8. The computer-implemented method of claim 7, wherein a frame in the second set of video frames is an interpolated frame.

9. A system comprising:
  a media ingestion service implemented by a first one or more electronic devices, the media ingestion service including instructions that upon execution cause the media ingestion service to:
    store segments of a live media presentation in a buffer;
    in response to a determination that a number of segments in the buffer has fallen below a first threshold:
      decode a first buffered segment into a first set of video frames;
      encode the first set of video frames to generate a second set of video frames that includes a frame repeated for a duration of a missing segment of the live media presentation; and
    in response to a determination that the number of segments in the buffer has fallen below a second threshold that is smaller than the first threshold:
      decode a second buffered segment into a third set of video frames having a first playback duration; and
      encode the third set of video frames to generate a fourth set of video frames, the fourth set of video frames having a second playback duration that is longer than the first playback duration; and
  a server implemented by a second one or more electronic devices, the server including instructions that upon execution cause the server to:
    receive, from a client, a first request for a segment that includes at least a portion of the second set of video frames; and
    send the segment to the client.

10. The system of claim 9, the media ingestion service including further instructions that upon execution cause the media ingestion service to, in response to a determination that the number of segments in the buffer has increased above a third threshold:
  decode a third buffered segment into a fifth set of video frames having a third playback duration; and
  encode the fifth set of video frames to generate a sixth set of video frames having the third playback duration.

11. The system of claim 9, wherein the second set of video frames has a slower framerate than the first set of video frames.

12. The system of claim 9, wherein the second set of video frames includes a number of frames greater than a number of frames in the first set of video frames.

13. The system of claim 9, wherein the number of segments in the buffer is based on a number of entries in a segment queue between a first location that contains a reference to a segment being written to the buffer and a second location that contains a reference to a segment being read from the buffer.

14. The system of claim 9, wherein the segments of the live media presentation are identified in a manifest that includes a network location of the segments.

15. The system of claim 14, wherein the manifest identifies only a single version of the live media presentation.

16. A computer-implemented method comprising:
  storing segments of a live media presentation in a buffer; and
  in response to a determination that a number of segments in the buffer has fallen below a first threshold:
    decoding a first buffered segment into a first set of video frames having a first playback duration; and
    encoding the first set of video frames to generate a second set of video frames, the second set of video frames having a second playback duration that is longer than the first playback duration, wherein the second set of video frames includes a number of frames greater than a number of frames in the first set of video frames, and wherein a frame in the second set of video frames is an interpolated frame.

17. The computer-implemented method of claim 16, further comprising:
  in response to a determination that the number of segments in the buffer has increased above a second threshold:
    decoding a second buffered segment into a third set of video frames having a third playback duration; and
    encoding the third set of video frames to generate a fourth set of video frames having the third playback duration.

18. The computer-implemented method of claim 16, wherein:
  the second set of video frames has a slower framerate than the first set of video frames; or
  the second set of video frames includes a number of frames greater than a number of frames in the first set of video frames.

19. A system comprising:
  a media ingestion service implemented by a first one or more electronic devices, the media ingestion service including instructions that upon execution cause the media ingestion service to:
    store segments of a live media presentation in a buffer; and
    in response to a determination that a number of segments in the buffer has fallen below a first threshold:
      decode a first buffered segment into a first set of video frames, and
      encode the first set of video frames to generate a second set of video frames that includes a frame repeated for a duration of a missing segment of the live media presentation, wherein the second set of video frames includes a number of frames greater than a number of frames in the first set of video frames, and wherein a frame in the second set of video frames is an interpolated frame; and a server implemented by a second one or more electronic devices, the server including instructions that upon execution cause the server to:

receive, from a client, a first request for a segment that includes at least a portion of the second set of video frames, and send the segment to the client.

20. The system of claim 19, wherein the media ingestion service includes further instructions that upon execution cause the media ingestion service to, in response to a determination that the number of segments in the buffer has increased above a second threshold:

decode a second buffered segment into a third set of video frames having a third playback duration; and encode the third set of video frames to generate a fourth set of video frames having the third playback duration.

* * * * *